Figure 1:
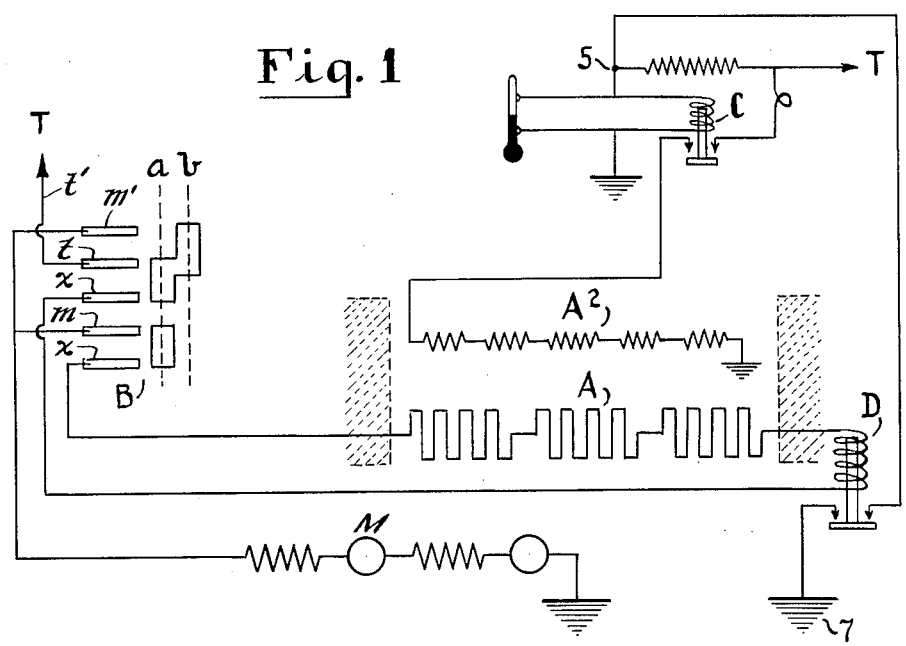

Oct. 3, 1933.   W. S. HAMMOND   1,928,687
RAILWAY CAR HEATING
Filed Sept. 21, 1927

INVENTOR
WILLIAM S. HAMMOND
BY
E. M. Bentley
ATTORNEY

Patented Oct. 3, 1933

1,928,687

UNITED STATES PATENT OFFICE 1,928,687

RAILWAY CAR HEATING

William S. Hammond, Albany, N. Y., assignor to Consolidated Car-Heating Company, Inc., Albany, N. Y., a corporation of New York Application September 21, 1927
Serial No. 221,104

8 Claims. (Cl. 219—20)

For a detailed description of the present form of my invention, reference may be had to the following specification and to the accompanying drawing forming a part thereof.

It has heretofore been proposed to utilize the motor-rheostat as a car-heating agency supplementing the ordinary heaters or as a substitute therefor. It has also been proposed, for the purpose of reducing the load on the power house, to cut off the heaters during the time current is being supplied to the propelling motors. For this purpose the heater circuit was brought to the motor-controller and closed thereby when the controller returns to its "off" position but opened when the controller starts away from that position. Such a suggestion has not, to my knowledge, been used practicably. Its defect lies in the necessity for enlarging the heaters to compensate for their reduced time of action as a result of which the cars that are accelerating would have their heat cut off while those standing still would be having too much heat. That this would effect a reduction of the load on the power plant has not been demonstrated.

In my present system I employ the regular heaters as heretofore employed with their customary thermostatic control and leave the heater circuit intact, but I arrange that while the motor rheostat is in the motor circuit the power magnet of the thermostat controlling the ordinary heaters shall be disabled. By this means the heaters and rheostats will not both be in the motor circuit at the same time. This means that, during the starting and accelerating period, which is the period when the rheostats are in circuit, the heaters which, if they were turned on at that time, would otherwise add to the heavy current through the rheostat and motors, are temporarily out of action. They come in again when the rheostat goes out and remain in action so long as the motors are proceeding without the rheostat subject to thermostatic control. This reduces the peak intake on individual cars and the load on the power plant by an amount equal to the heater current. At the same time the former heater current is reduced by an amount equal to that consumed in the rheostat, which also heats the car. Otherwise the system remains as it is at present, and my addition requires nothing more than a single relay which does not involve any change in the controller or the heater circuit, or the heaters or rheostats. I prefer to utilize the heat of the rheostat as well as the heater whereby, if the inactive periods of the heater are of material consequence, the rheostat-heat will compensate therefor, since it serves alternately therewith. It is to be understood that the heater coils and the rheostat are to be placed within the space to be heated, i. e., they are located within the car, as indicated in the drawing, in such relative positions that the interior of the car will receive the benefit of the heat generated by both. The arrangement is such that the heat of the rheostat is utilized while the heater coils are inactive.

Figure 2:
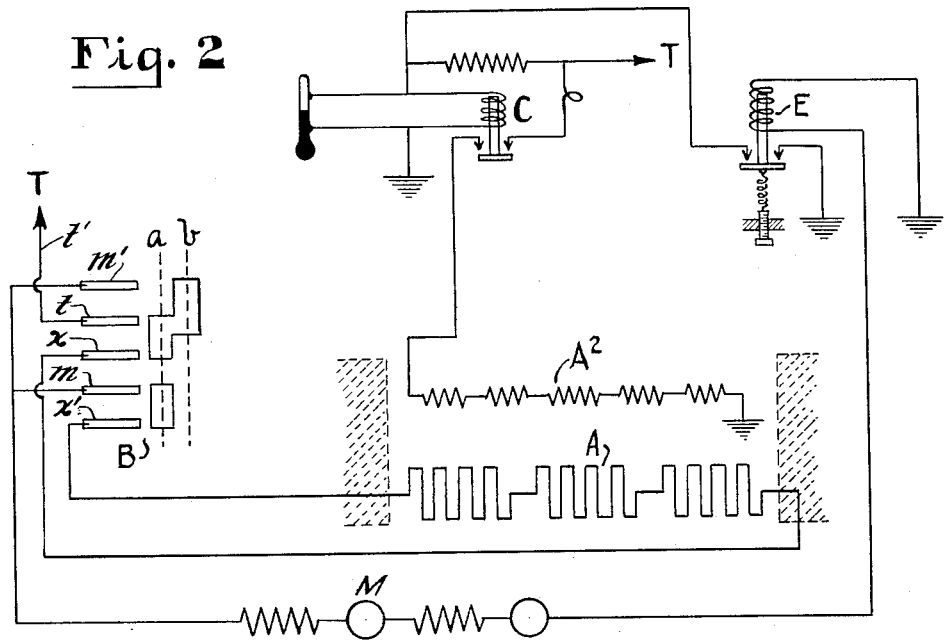

In the drawing, Figs. 1 and 2 are diagrammatic illustrations of two modifications of my invention.

Referring to the drawing, A represents the motor-rheostat and $A^2$ the heaters. B is a standard form of controller, the dotted line $a$ indicating the controller position when A is in the motor circuit, and $b$ the running position when the rheostat has been cut out, and the current is flowing through the normal motor circuit. It will be noted that the controller B is provided with a plurality of terminal contacts arranged in a group. Of these the contact $t$ is the terminal of the line wire $t'$. The contacts $x$ and $x'$ are the terminals of the rheostat circuit and the contacts $m$ and $m'$ are the contacts of the motor circuit.

In the first position $a$ the circuit is closed from the line wire $t'$ through contacts $t$ and $x$ to the rheostat and through the contacts $x'$ and $m'$ through the motor circuit in series. With the controller member in the position $b$, the circuit is from the line wire $t'$ through contact $t$ and $m'$ through the motor circuit and completely shunting the rheostat circuit. C represents the power magnet of a standard thermostatic controller for the heaters $A^2$. The trolley connection or source of voltage supply is indicated at T. A relay for short-circuiting the power-magnet C of the thermostat is shown at D as included in the circuit of rheostat A so as to be cut in and out therewith by the controller B. This relay D is the characterizing feature of my invention, the rest being so well known as to require no detailed description. This relay controls a circuit which shunts the heater and is energized whenever the rheostat A is in circuit and when so energized will close a short-circuit for power magnet C from the point 5 to ground at 7, the normal circuit being from the point 5 through said magnet C to ground. When so short-circuited the magnet opens the route from trolley T through heaters $A^2$ to ground, but closes that route when it is energized. The thermostat energizes C when the temperature falls below the prescribed low-heat degree and de-energizes it when it exceeds the prescribed high-heat degree in a well known way. Manifestly the momentary inclusion of rheostat A in the motor circuit when the controller moves from its "off" towards its "on" position, will correspond with a momentary cutting-out of the heaters A² and they will be cut in again as the further movement of the controller cuts out the rheostat from the motor circuit. Both rheostat A and heaters A² are indicated as contained in a common airway leading to the car body so that they will both contribute whatever heat they may have to the car.

In Fig. 2 I have shown a modification wherein the momentary cutting out of the heater A² is produced not by the physical cutting in of the rheostat A but by the amount of current which flows in the motor circuit at that time. Instead of the magnet D as the agent which short-circuits the power-magnet C of the thermostat, I employ an adjustable magnet E contained in the motor-circuit which accomplishes the same result. This magnet is permanently in the motor-circuit but only acts when the motor current exceeds the amount for which it is adjusted. By so adjusting it that it will act when the current is such as would flow when rheostat A is in the circuit it will accomplish the same result as magnet D, but its action is not restricted to the physical presence of the rheostat in the circuit nor is its adjustment limited to any specific current. Said magnet E controls a circuit which shunts the heater.

What I claim as new and desire to secure by Letters Patent is:

1. A car heating system comprising a motor circuit including rheostat coils arranged to heat the vehicle, special heating coils also arranged to heat the vehicle and arranged in a circuit which is independent of the motor circuit, a magnet controlling the special heater circuit, a thermostat controlling said magnet, a disabling circuit shunting said magnet, and a relay arranged to control said disabling circuit, and means for causing the relay to energize said disabling circuit while current is passing through the rheostat coils, said rheostat coils and said special heating coils being relatively positioned to furnish heat for the interior of the car, so that the heat of the rheostat is utilized while said special heating coils are inactive.

2. A car heating system comprising a heater, a motor rheostat, an electromagnetic controlling switch for the heater, a thermostat controlling said switch, a disabling circuit shunting said switch, and a relay in circuit simultaneously with said rheostat, said relay having means for closing said disabling circuit while current is passing through said rheostat, said heater and said rheostat being relatively positioned to furnish heat for the interior of the car, so that the heat of the rheostat will be utilized while said disabling circuit is closed.

3. A car heating system comprising a heater, a motor rheostat, a switch for said heater, a thermostat controlling said switch, a disabling circuit shunting said switch, a controller having contacts for connecting said rheostat in the motor circuit, and a relay acting to close said disabling circuit, said relay being included in the motor circuit simultaneously with said rheostat, said heater and said rheostat being relatively positioned to furnish heat for the interior of the car, so that the heat of the rheostat will be utilized while said disabling circuit is closed.

4. A car heating system comprising a motor circuit, rheostat coils arranged to heat the vehicle, controller means for selectively including the rheostat coils in or cutting them out of the motor circuit, special heating means for the vehicle arranged in a different circuit, a switch included in the circuit of the special heating means and controlling the same, a disabling circuit shunting the last mentioned switch, and means controlling said disabling circuit, said controller means and the disabling-circuit-controlling means being so constructed and arranged that the disabling circuit is energized while current is passing through the rheostat coils so that the heat of said rheostat coils is utilized while the heating means is inactive.

5. A car heating system comprising a motor circuit, rheostat coils arranged to heat the vehicle, controller means for selectively including the rheostat coils in or cutting them out of the motor circuit, special heating coils for the vehicle arranged in a different circuit, a switch included in the circuit of said special heating coils and controlling the same, a circuit including means acting normally to retain said switch in closed position, a disabling circuit shunting the last mentioned switch operating circuit, and electro-magnetic means controlling said disabling circuit, said controller means and said electro-magnetic means being so constructed and arranged that the disabling circuit is energized while current is passing through the rheostat coils, so that the heat of said rheostat coils is utilized while the heating coils are inactive.

6. In a car heating system, a line wire having a terminal contact, a normal motor circuit having terminal contacts, a rheostat circuit also having terminal contacts, all of said contacts being arranged in a group, controller means cooperating with said contacts, said controller means and the respective contacts being so constructed and arranged that while the controller means is in one position the rheostat circuit and the motor circuit are connected in series with the line wire, and while the controller is in another position the motor circuit is connected with the line wire in a manner to shunt the rheostat circuit, special heating means for the vehicle arranged in a different circuit, and means controlled by the rheostat circuit while in series with the motor circuit for breaking the circuit to the heating means, so that the heat of the rheostat coils is utilized while the heating coils are inactive, said last mentioned means being located between the rheostat circuit and the motor circuit.

7. In a car heating system, a line wire having a terminal contact, a normal motor circuit having terminal contacts, a rheostat circuit also having terminal contacts, all of said contacts being arranged in a group, controller means cooperating with said contacts, said controller means and the respective contacts being so constructed and arranged that while the controller means is in one position the rheostat circuit and the motor circuit are connected in series with the line wire, and while the controller is in another position the motor circuit is connected with the line wire in a manner to shunt the rheostat circuit, special heating means for the vehicle arranged in a different circuit, and including a normally closed circuit maintaining switch, and means controlled by the rheostat circuit while in series with the motor circuit for moving said circuit maintaining switch to inoperative position, so that the heat of the rheostat coils is utilized while the heating coils are inactive.

8. In a car heating system, a line wire having a terminal contact, a normal motor circuit having terminal contacts, a rheostat circuit also having terminal contacts, all of said contacts being arranged in a group, controller means cooperating with said contacts, said controller means and the respective contacts being so constructed and arranged that while the controller means is in one position the rheostat circuit and the motor circuit are connected in series with the line wire, and while the controller is in another position the motor circuit is connected with the line wire in a manner to shunt the rheostat circuit, special heating means for the vehicle arranged in a different circuit, said heating circuit including a switch, a circuit for normally maintaining said switch in circuit closed position, and electromagnetic means controlled by said rheostat circuit while in series with the motor circuit, and located between said rheostat circuit and the normal motor circuit for deenergizing said maintaining circuit, so as to break the circuit to the heating means while the current is passing through the rheostat circuit, whereby the heat of the rheostat circuit is utilized while the heating means is inactive.

WILLIAM S. HAMMOND.